United States Patent

[11] 3,545,588

| [72] | Inventors | John P. Corley;<br>Helen Emily, Executrix of said Corley,<br>deceased, Winnetka, Illinois |
|---|---|---|
| [21] | Appl. No. | 697,999 |
| [22] | Filed | Jan. 15, 1968 |
| [45] | Patented | Dec. 8, 1970 |
| [73] | Assignee | Corley-Miller, Inc.<br>a corporation of Ohio |

[54] SCALE TO LABELLER FEED
16 Claims, 7 Drawing Figs.

| [52] | U.S. Cl. | 198/19,<br>198/39, 198/190 |
|---|---|---|
| [51] | Int. Cl. | B65g 69/00 |
| [50] | Field of Search | 198/19, 39,<br>190, 21, 105; 156/360 |

[56] References Cited
UNITED STATES PATENTS

| 530,112 | 12/1894 | Maddock | 198/105X |
|---|---|---|---|
| 1,929,204 | 10/1933 | Jeffrey et al. | 198/21 |
| 3,264,161 | 8/1966 | Stremke | 156/360 |
| 3,342,661 | 9/1967 | Arvidson et al. | 156/360 |

*Primary Examiner*—Hugo O. Schulz
*Attorney*—Hofgren, Wegner, Allen, Stellman & McCord ABSTRACT: A package weighing and labeling system in which a scale has a scale platform for weighing packages and a labeling machine has a position for labeling packages. A power driven conveyor is disposed to move a package from the scale platform to the labeling machine and a movable package stop means is provided for holding the package at the labeling position. A drive means operates the conveyor and the package stop means in timed relation through a cycle so as to move a weighed package from the scale platform to the labeling machine automatically in response to a completed weighing operation of a package at the scale. The package stop means operates in the cycle so as to permit the previously weighed and labeled package to be moved by the conveyor from the labeling position before the newly weighed package arrives at the labeling machine, and to subsequently stop the newly weighed package at the labeling position. The drive means is stopped automatically at the end of the cycle The functioning of the conveyor, the movement of the package stop means, and the stopping of the drive means at the end of the cycle are all controlled by a common driven shaft which carries a plurality of cams arranged to effect the timed cycle of operation.

INVENTOR.
JOHN P. CORLEY, DECEASED,
By HELEN EMILY CORLEY, EXECUTOR

BY *Hofgren, Wegner, Allen,
Stellman & McCord*

ATTORNEYS.

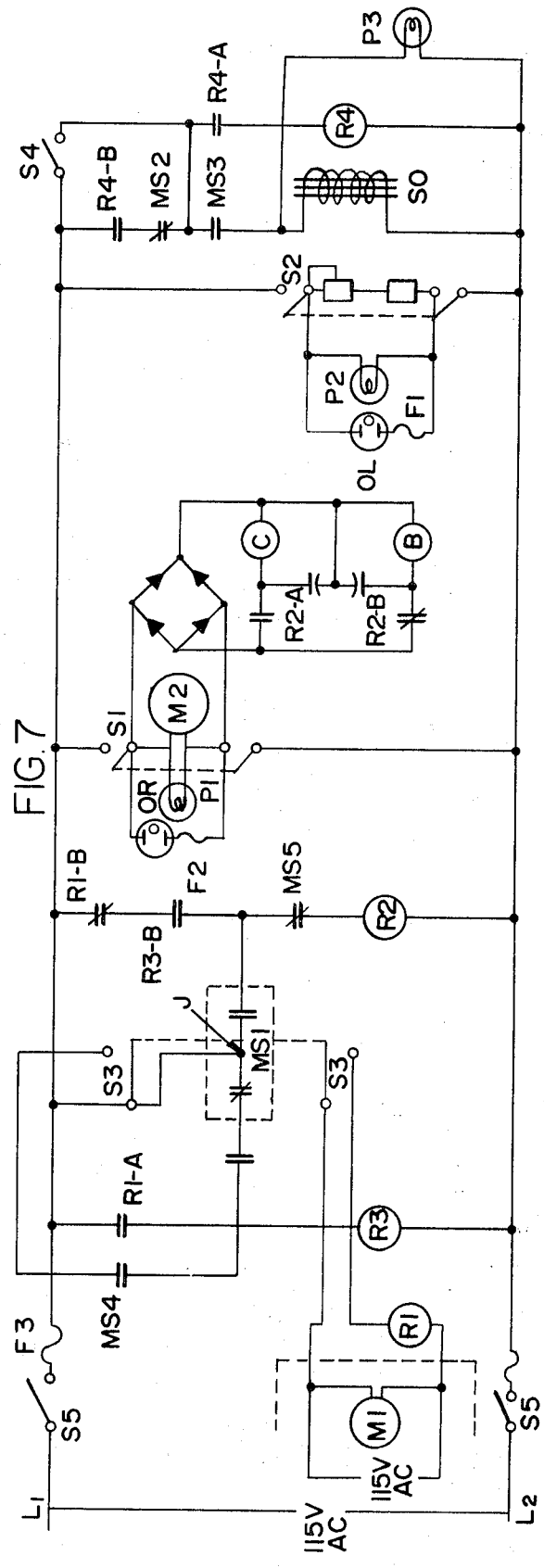

| CONVEYOR (CAM 28) | DOWN | DOWN | RISING | LOWERING |
|---|---|---|---|---|
| | 0° | 90° | 180° | 270° | 360°(0°) |
| STOP PINS (CAM 30) | UP | LOWERING | RISING | UP |
| FUNCTION | BELTS START TO ROTATE; CYCLE STARTS | PREVIOUSLY WEIGHED & LABELLED PACKAGE PERMITTED TO LEAVE LABELLING MACHINE | NEW WEIGHED PACKAGE PICKED UP FOR MOVEMENT FROM SCALE TO LABELLING MACHINE | NEW WEIGHED PACKAGE STOPPED AT LABELLING MACHINE AS CONVEYOR IS LOWERED TO START NEXT CYCLE |

SCALE TO LABELLER FEED

BACKGROUND OF THE INVENTION

It is known to provide a package weighing and labeling system in which wrapped packages are placed on a scale which, on making weight, sends a signal to a computer operated label printer which dispenses a properly printed label to a labeling machine for affixing the label to a package. Certain mechanisms are available which move a weighed package from the scale platform toward the labeling machine in response to making weight at the scale. Reference can be had to a patent to Arvidson et al. U.S. Pat. No. 3,342,661 for an example of such package handling mechanisms. Heretofore, such mechanisms were quite complicated and included a combination of various movable members which moved a weighed package in stages to the labeling machine. The problem encountered with such package handling mechanisms centered around the requirement that the scale platform must not be interfered with during a weighing operation and the device which moved a package from the scale platform heretofore was a distinct conveying means from the other conveying portions of the system which carried the weighed package from the scale to its proper position for labeling at the labeling machine. This invention relates to a package handling mechanism for such systems which is greatly simplified and is operated from a single rotary shaft operatively connected to the drive means which runs the labeler and labeler feed.

SUMMARY OF THE INVENTION

An object of this invention is to provide a new and improved package handling mechanism for use in a package weighing and labeling system.

A further object of this invention is to provide a package handling mechanism as set forth in the preceding paragraph which includes a conveyor leading from the scale to the labeling machine and a movable package stop means at the labeling machine operative in cycle automatically in response to making weight at the scale to move the previously weighed and labeled package from the labeling machine before the newly weighed package arrives at the labeling machine from the scale, and to subsequently stop the newly weighed package at the labeling machine.

Still another object of this invention is to provide a package handling mechanism of the character described wherein the scale platform comprises a plurality of spaced parallel ribs extending in the direction of movement of the conveyor, and the conveyor includes a plurality of endless belts alternately disposed between the ribs of the scale platform.

Yet a further object of this invention is to provide a package handling mechanism as set forth in the preceding paragraph wherein the conveyor is pivoted at one end for movement in a direction normal to the scale platform between a first position wherein the belts are below the scale platform to permit packages to be weighed on the platform and a second position wherein the belts protrude through the scale platform ribs forming a conveyor bed which moves a package from the scale platform after it has been weighed. A plurality of package stop pins extend upwardly between the conveyor belts at the labeling machine and are vertically movable in the above-described cycle into and out of the path of movement of the packages on the conveyor belts.

A further object of this invention is to provide a package handling mechanism as set forth in the preceding paragraph which includes a drive means comprising a driven shaft having cam means thereon to pivot the conveyor about its one end and move the package stop pins into and out of the path of movement of the packages on the conveyor belts in a timed relationship through a cycle so as to move a weighed package from the scale platform to the labeling machine, move the previously weighed and labeled package from the labeling machine, subsequently stop the newly weighed package at the labeling machine, and stop the drive means at the end of the cycle.

Still another object of this invention is to provide in a system as described above means for locking the conveyor in a raised position out of interference with the scale platform to provide for repeat labeling of packages with a label having an established weight preset on the scale.

Other features, objects and advantages of the invention will become apparent from the following description taken in connection with the accompanying drawings.

DESCRIPTION OF THE DRAWINGS

FIG. 6 is a timing diagram illustrating the timed relationship of the conveyor and stop pins; and FIG. 7 is an electrical diagram showing electrical circuitry for operating the structure of this invention.

DETAILED DESCRIPTION OF THE INVENTION

Figure 1:
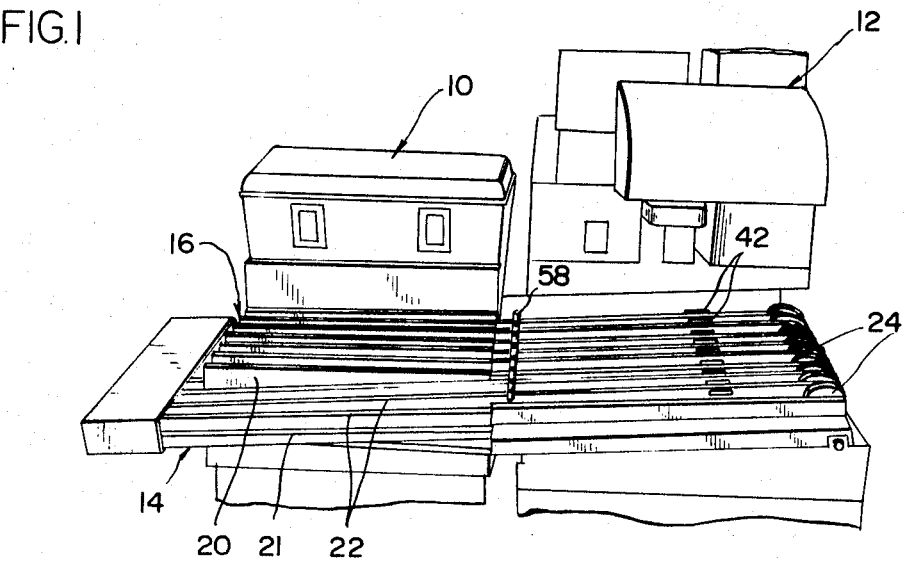
FIG. 1 is a perspective view of a package weighing and labeling system incorporating the package handling mechanism of this invention, with the conveyor in a lowered position to permit weighing of a package on the scale platform and with the package stop pins lowered out of the path of movement of packages on the conveyor belts.
Figure 2:
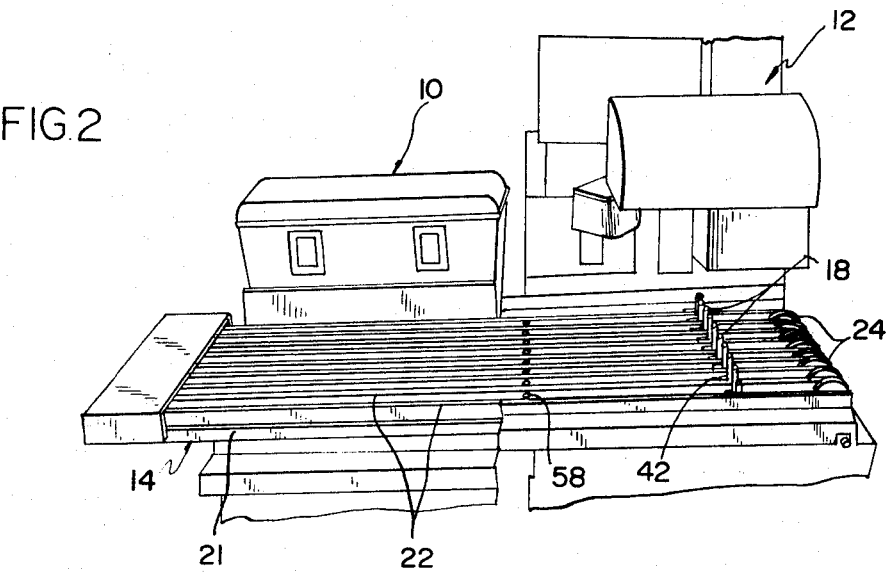
FIG. 2 is a perspective view similar to that of FIG. 1 with the conveyor belts and package stop pins in a raised position to move a weighed package from the scale platform to the labeling machine and stop the weighed package at the labeling position.

Referring to the drawings in greater detail, the package handling mechanism of this invention is incorporated in a package weighing and labeling system shown in perspective in FIGS. 1 and 2. The system includes a weighing scale and a labeling machine, indicated generally as 10 and 12, respectively. The mechanism is an automatic computer type similar to the mechanism disclosed in the patents to Allens, U.S. Pat. Nos. 2,948,465 and 2,948,466, which weighs, computes, prints the total price and other information on a label and dispenses this label to a labeling mechanism for affixing to a package. The labeling machine is automatic and is similar to the mechanism disclosed in a patent of Arvidson et al. U.S. Pat. No. 3,342,661, issued Sept. 19, 1967. Reference may be had to these disclosures for a more detailed understanding of the weighing and labeling construction. For understanding herein, it only need be understood that a conveyor, indicated generally at 14 in FIGS. 1 and 2, moves a package from a scale platform, indicated generally at 16, and delivers it to a labeling position at the labeling machine 12 where the labeling machine can receive a printed label and apply it to the package. The label will be printed with the weight of the package and the price and, normally, also the price per pound, with this information being established by a computer associated with the scale and the label printer adjacent the labeling machine.

To permit a better understanding of the disclosure, the cycle of operation of the package handling mechanism of this invention will now be described in relation to FIGS. 1 and 2 before going into greater detail of the structure comprising the invention. When a wrapped package is placed on the top surface of the scale platform 16, the scale will come to balance and indicate the package weight. A signal is sent to the automatic computer which is connected to the scale electronically. The computer will send the proper signals to the label printer which in turn prints and dispenses a label to the labeling machine 12. When a label has been dispensed, an electrical signal is sent to the labeling machine. This same signal is utilized to operate the package handling mechanism through one complete cycle and then stop and wait for the next signal. It is sufficient to say for the present that the conveyor 14 is of the power driven endless belt type and is pivoted at its right end as viewed in FIGS. 1 and 2. When the labeler gets the signal to operate, the same signal actuates the conveyor so that the conveyor will start to travel in a direction to carry the weighed package toward the labeling machine. At the same time, the conveyor will pivot about its right end to pick up the package on the scale platform so that the traveling conveyor can carry it to a set of movable package stop pins 18 (FIG. 2) for positioning at the labeling machine. In general, the package stop pins are movable vertically into and out of the path of movement of the packages on the conveyor 14 so as to permit the previously weighed and labeled package to be moved away from the labeling machine before the newly weighed package arrives at the labeling machine. The conveyor 14 and package stop pins 18 are stopped at the end of the cycle in a position as shown in FIG. 1 with the scale platform 16 exposed to receive and weigh another package.

Turning now to the structural details, the scale platform 16 (FIG. 1) comprises a plurality of spaced, parallel ribs 20 extending horizontally in the direction of movement of the conveyor 14. The conveyor comprises a unitary elongated, generally rectangular frame 21 which spans both the scale and the labeling machine. A plurality of endless traveling belts 22 pass around large belt driving rollers 24 at one end of the frame and about idler rollers 25 at the other end of the frame. The belts 22 are disposed alternately between the ribs 20 of the scale platform. In the preferred embodiment, the belts are approximately one-half inch wide and are spaced approximately 1 inch apart to accommodate the ribs 20 of the scale platform 16. The conveyor 14 overhangs the scale platform at one end, to the left as viewed in the drawings, and is pivoted about the large belt driving rollers 24 at its other end, to the right as viewed in the drawings. Thus, the above-described cycle of operation is performed by raising the conveyor belts 22 above the ribs 20 of the scale platform 16 to pick up a weighed package. The traveling belts 22 move the package from the scale to the labeling machine, and then the package stop pins 18 move into and out of the path of the packages on the conveyor belts in a timed relation to move the previously weighed and labeled package from the labeling machine before the newly weighed package arrives. In the idling position, the machine stops with the conveyor in a lowered position as seen in FIG. 1 so that the ribs 20 of the scale platform extend between and above the top surface of the belts 22 so that another wrapped package can be placed on the scale platform 16.

Figure 3:
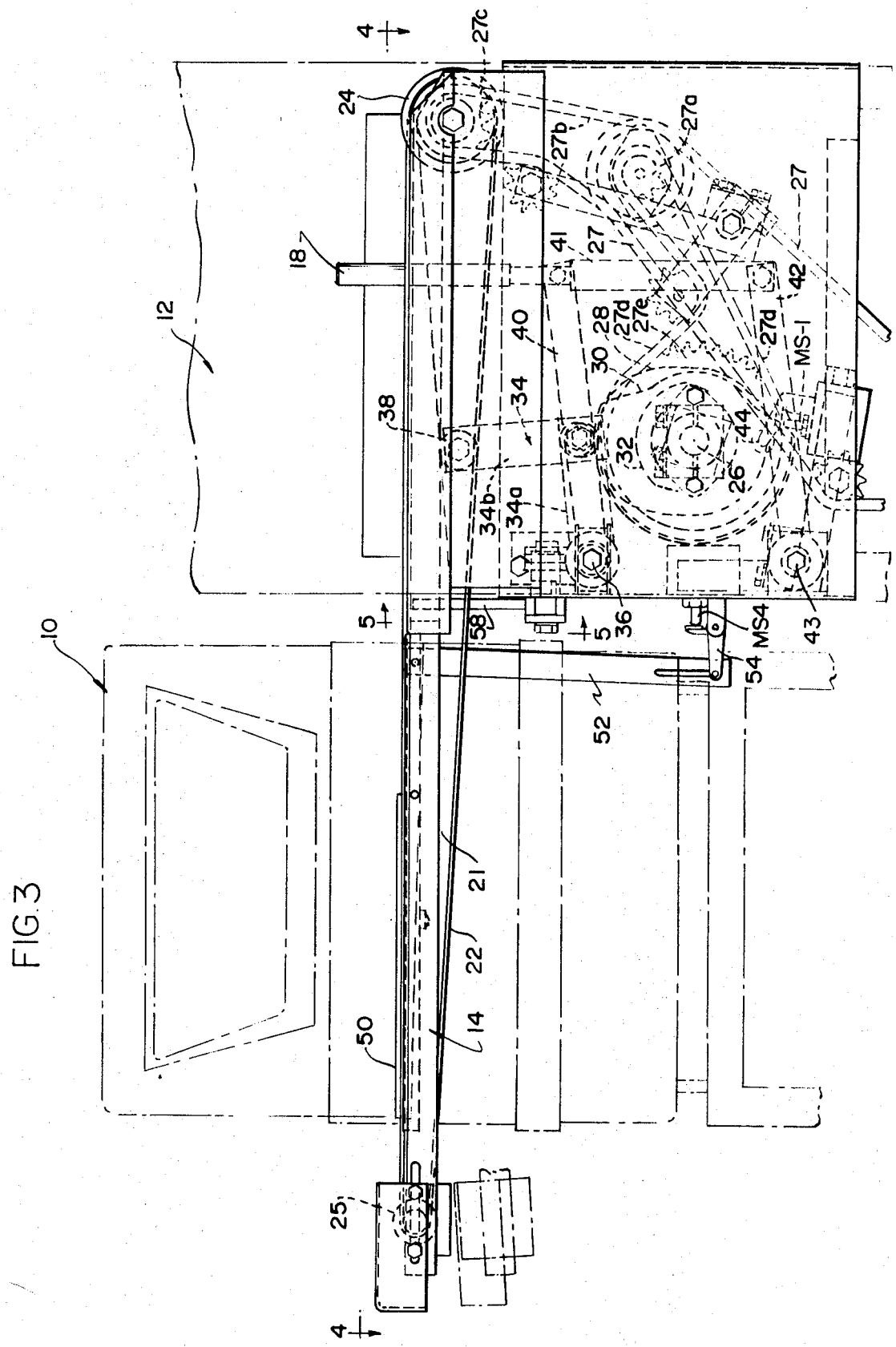
FIG. 3 is a front elevation view of the package handling mechanism in the position shown in FIG. 2, with the scale and labeling machine shown in phantom.
Figure 4:
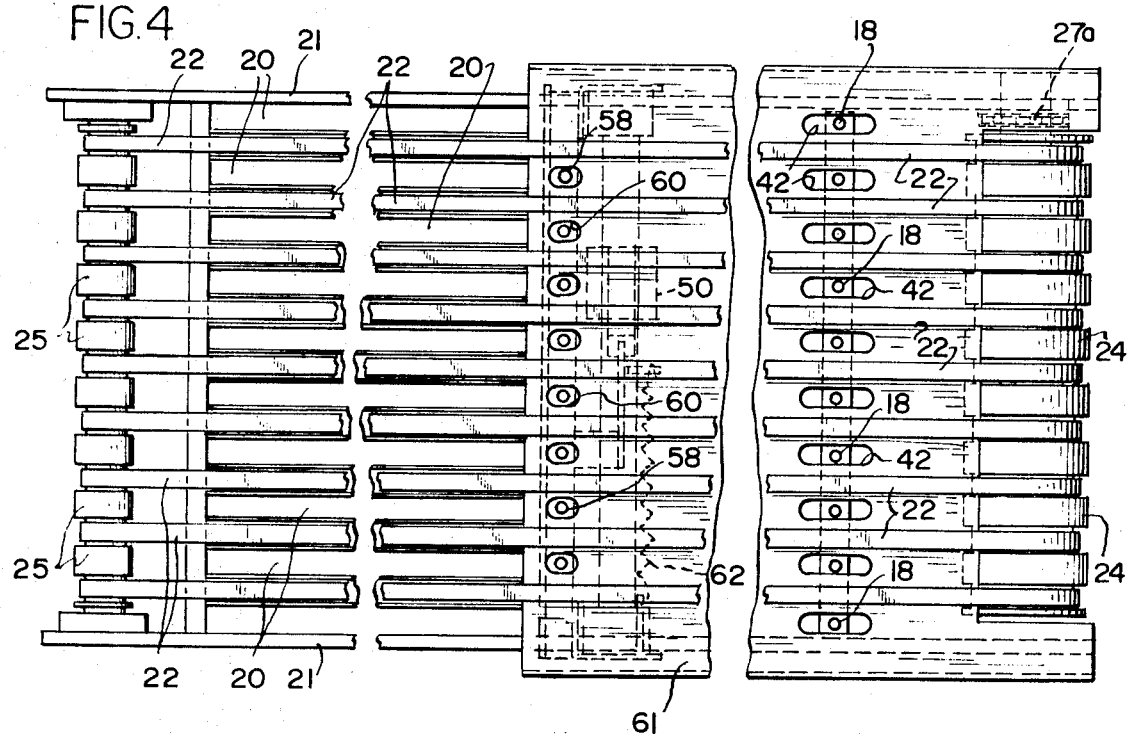
FIG. 4 is a top plan view of the package handling mechanism of this invention taken generally in the direction of line 4—4 of FIG. 3.

The drive means for carrying out the above cycle of operation is shown in FIG. 3 and includes an endless drive chain 27 which is operated by a power source (not shown). The drive chain 27 passes around a sprocket assembly 27a. A first driven chain 27b passes around the sprocket assembly 27a and around a sprocket 27c at one end of rollers 24 to operate the conveyor belts 22. A second driven chain 27d also passes around the sprocket assembly 27a and around a gear 27e which is fixed to a drive shaft 26, the rotation of which controls the raising and lowering of the conveyor 14 as well as controls the package stop pins 18. Positioned about the drive shaft 26 are a plurality of cams 28, 30 and 32. As will be more fully set forth below, cam 28 rotates with the shaft 26 such that the rises and falls on the cam engage the underside of a bellcrank, indicated generally at 34, which has a generally horizontal leg 34a and a generally vertical leg 34b. The bellcrank 34 is pivoted at the outer end of leg 34a at a point 36 on the frame of the structure. The outer leg 34b of the bellcrank 34 carries a roller 38 which engages the underside of the conveyor frame 21 to pivot the conveyor about rollers 24 and thereby raise and lower the conveyor through the cycle described above. Cam 30 also rotates with shaft 26 and has rises and falls which engage a link arm 40 which is also pivoted at point 36. The link arm is operatively connected to the package stop pins 18 so that the pins move into and out of the path of the packages moving on the conveyor 14 in a timed relationship to the raising and lowering of the conveyor through the cycle described above. More particularly, as the belts start to move, cam 30 permits the package stop pins to recede below the belts so the package that was labeled on the previous cycle can be carried away from the labeling machine. After the previously labeled package has been moved out and before the next package arrives, cam 30 moves the package stop pins up through slots 42 (FIG. 4) between the conveyor belts 22 to stop the next package at the labeling machine 12 and hold it in the labeling position while the belts continue to run and slip under the package until the labeling cycle at machine 12 has been completed and the machine stops again with the belts in a down position to expose the ribs 20 of the scale platform 16 for another weighing operation. Cam 32 engages a follower 44 which operates a switch MS1 to stop the machine at the end of the above-described cycle.

The link arm 40 comprises one leg of a parallelogram structure which maintains the package stop pins 18 vertical at all times. The link arm 40 is pivoted to one end of a vertical support arm 41 which is pivoted at its other end to a pivot arm 42. Pivot arm 42 is pivoted at a fixed point 43 in vertical alinement with point 36. The package stop pins 18 are formed as vertical extensions of support arm 41 which of necessity remains vertical at all times because the opposite side (formed by pivot points 36 and 43) of the parallelogram is vertically stationary at all times, as the pivot arms 40 and 42 pivot about points 36 and 43, respectively.

FIG. 6 is a timing diagram illustrating the timed relationship of the conveyor 14 and stop pins 18 as operated by cams 28 and 30, respectively. This diagram illustrates the above-mentioned cycle of operation and it is believed to be self-explanatory to one skilled in the art.

Figure 5:
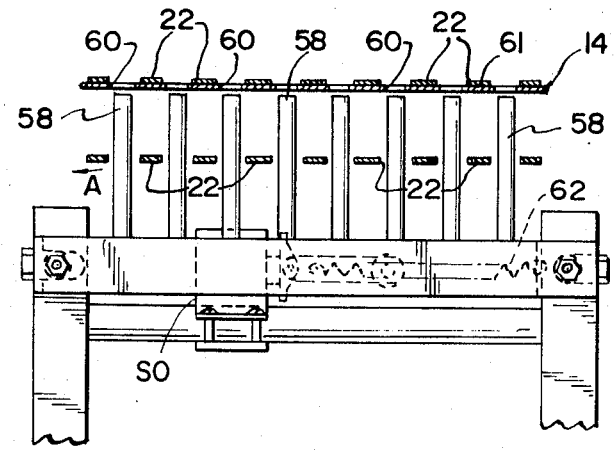
FIG. 5 is a partial vertical section view taken generally in the direction of line 5—5 of FIG. 3.

The weighing and labeling system of this invention is designed to provide for repeat labeling which is used for sale items when, for example, three pounds of an item such as ground beef are sold for a fixed amount. All packages will be marked with the fixed amount and all packages will be marked 3 pounds even though the pounds will vary a little over or under the 3 pound amount. When repeat labeling, the conveyor belts 22 are locked in a raised position so that the ribs 20 of the scale platform 16 are below the surface of the belts 22. This is necessary to prevent disturbance of the established weight which is preset in the computer of the scale. Since the scale in this condition cannot send a signal to the other electrical components to indicate that weight has been established, it is necessary to manually trip a switch which will send the start signal for operating the labeling, as well as the shaft 26 which carries the cams 28 and 30 which control the conveyor 14 and package stop pins 18, respectively. For these purposes, a repeat tripping hand lever 50 (FIG. 3) is provided for pressing by an operator and is connected to a repeat tripping link arm 52 which, through a switch lever 54, operates a repeat labeling switch MS4 to start a cycle of operation as described above with the exception of raising and lowering of the conveyor 14. In order to lock the conveyor belts in their raised position to prevent disturbance of the established weight preset in the computer of the scale, a plurality of support pins 58 (FIG. 5) are positioned below the conveyor 14 and are normally positioned in vertical alinement with a plurality of slots 60 through a bed portion 61 of the conveyor at the labeling machine. The pins 58 are biased to this position of alinement with slots 60 by a coil spring 62 which urges the pins to the right in FIG. 5. To repeat label, a repeat lock switch S4 (FIG. 7) is closed (as described in more detail hereinafter). With S4 closed, on tripping the repeat labeling microswitch MS4 a solenoid SO (FIG. 7) is energized and moves the pins 58 laterally in the direction of arrow A against the biasing of spring 62 out of alinement with slots 60. During the cycle, as the cam 28 permits the conveyor to move downwardly, the conveyor bed portion 61 comes to rest on top of the pins 58 and is locked in its raised position so as not to disturb the established preset weight on the scale.

Conveyor support pins 58 also aid in hand weighing and labeling since they are at a very convenient location for resting a package receiving tray. When the machine conveyor 14 is in the lowered position to expose the ribs 20 of the scale platform 16, the solenoid operated pins 58 protrude through the slot 60 of the conveyor bed and act as a support for one end of the package receiving tray without danger of part of this tray touching the scale platform if it should extend beyond the pins 58 in the direction of the scale 10. The other end of the tray rests on the large belt driving rollers 24. This puts the tray in a very convenient location under the labeling machine without interference with the scale platform.

Referring to the electrical diagram of FIG. 7, the electrical circuitry for carrying out the cycle of operation of the invention will now be described. For automatic cycling in response to a completed weighing operation of a package at the scale 10, a repeat lock switch S4 is open since repeat labeling (as described above) is not desired. If the conveyor 14 is in its raised position, a repeat switch S3 is closed and repeat labeling microswitch MS4 is closed to cause the carrier to move to its lowered position. If the carrier is already in its lowered position, this latter step is omitted. With the repeat switch S3 in its closed position, the machine is now ready to receive a package on the scale. After a package is placed on the scale platform 16, and a weight is reached, coded information is sent to the computer where it is processed and transmitted to the labeling machine 12. Voltage will appear across a label printer feed motor M1, and through the closed repeat switch S3 across relay R1. Normally open contacts R1-A will close, placing voltage across relay R3. Normally open contacts R3-A will then close and the voltage across relay R3 will he held through a normally closed section (to the left of junction J in FIG. 7) of a labeler cycle microswitch MS1. Normally open contacts R3-B will close but no voltage will appear across relay R2 since the normally closed contacts R1-B have been opened by the voltage across relay R1. The delivery of a printed label will open the circuit to the label printer feed motor M1 and across relay R1. Normally open contacts R1-A will then open and normally closed contacts R1-B will close. Voltage will appear across the relay R2 through a normally closed safety microswitch MS5, normally open contacts R3-B which are held closed by relay R3 and the normally closed contacts R1-B. Normally closed contacts R2-B will open, releasing a brake B which controls drive shaft 26 and normally open contacts R2-A will close to engage a clutch C controlling drive shaft 26 so that a labeler drive motor M2 will drive the labeler, labeler feed and drive shaft 26 into a cycle. A normally closed section (to the right of junction J in FIG. 7) of the labeler cycle microswitch MS1 opens as the labeler microswitch cam 32 (FIG. 3) rotates on the drive shaft 26. The voltage across relay R3 disappears and contacts R3-A and R3-B will open. The normally open section of labeler cycle microswitch MS1 closes maintaining the voltage through safety microswitch MS5 on the relay R2 which holds the normally open contacts R2-A closed and the clutch C engaged. The labeler microswitch cam 32 continues to turn until the follower 44 of labeler cycle microswitch MS1 drops in a lobe and MS1 opens. The voltage across the relay R2 disappears and the contacts R2-A open as contacts R2-B close so that the clutch C disengages and the brake B engages to stop rotation of shaft 26 at the end of the cycle. All of the control elements are now in position so that packages may be successively placed on the scale platform 16 to initiate another cycle.

Still referring to the electrical diagram of FIG. 7, the repeat labeling as described above is carried on as follows. The repeat lock switch S4 is closed so that voltage will appear across normally open cycle locking microswitch MS-3 through solenoid SO and relay R4. A package is placed on the scale platform 16 and the scale, reaching the accurate weight, will send coded information to the computer where it is processed and transmitted to the ticketer. Voltage will appear across the label printer feed motor M1 and through the closed repeat switch S3 across relay R1. The electrical circuitry will then function as described above until the normally open contacts R2-A close and the clutch C engages. This portion of the repeat cycle is substantially the same as with automatic cycling because it is necessary to have the conveyor raised so that the support pins 58 can be moved laterally under the conveyor bed portion 61. However, at this point a follower 46 (not shown in FIG. 3) of a repeat locking cycle microswitch MS3 is engage by cam 32 with the conveyor 14 in its raised position. Voltage appears across the solenoid SO and the relay R4 through switch MS3 and the closed repeat lock switch S4. The solenoid SO moves pins 58 laterally under the conveyor bed portion 61 and locks the conveyor 14 in its raised position. The normally open contacts R4-A close, holding the voltage across the solenoid SO and the relay R4, through repeat lock switch S4. The cam 32 continues to turn until the follower 44 of microswitch MS1 drops in the cycle lobe and MS1 opens. The voltage across the relay R2 disappears and contacts R2-A open as contacts R2-B close so that the clutch C disengages and the brake B engages. The labeler, labeler feed and shaft 26 stop operating. The repeat switch S3 is placed in repeat position. The label printer repeat switch is set to repeat. A package is placed on the conveyor and the operator trips the repeat hand lever 50 and repeat labeling microswitch MS4 closes. Repeat switch S3 has opened the circuit to the relay R1, inhibiting movement of contacts R1-A and R1-B during the repeat cycle. Closing the normally open labeling microswitch MS4 places a voltage across relay R3 and normally open contacts R3-A close holding voltage across relay R3. Normally open contacts R3-B close, placing a voltage through normally closed contacts R1-B and safety switch MS5 on relay R2. Contacts R2-B open, disengaging the brake B as contacts R2-A close engaging clutch C. The labeler, labeler feed and shaft 26 start operation. Normally closed labeler cycle microswitch MS1 opens and the voltage across relay R3 disappears so that contacts R3-A and R3-B open. The normally open section of labeler cycle microswitch MS1 closes, holding the voltage across relay R2. The labeling machine affixes the label to the package and the cam 32 continues to turn until the follower 44 of labeler cycle microswitch MS1 drops in the cycle lobe and opens microswitch MS1. The voltage across the relay R2 disappears and contacts R2-A open as contacts R2-B close to disengage the clutch and engage the brake, respectively. The labeler, labeler feed and shaft 26 stop operating and a second package may be placed on the conveyor 16.

The foregoing detailed description has been given for clearness of understanding only and no unnecessary limitations should be understood therefrom as some modifications will be obvious to those skilled in the art.

It is claimed:

1. A package weighing and labeling system comprising: a scale having a scale platform for weighing packages; a labeling machine having a position for labeling packages; a plurality of conveying elements movable both horizontally between said scale platform and said labeling position for moving a package in a path from the platform to the labeling position and vertically between upper and lower positions with the elements in engagement with a package while in the upper position to move the package in said path and out of engagement with a package when in the lower position; movable stop means for holding the package at said labeling position; and drive means for operating said conveying elements and moving said package stop means in timed relation through a cycle so as to move a weighed package from said scale platform to said labeling position, move the previously weighed and labeled package from said labeling position before said weighed package arrives at said labeling position and stops said weighed package at said labeling position.

2. The package weighing and labeling system of claim 1 including electrical circuit means to actuate said drive means at the completion of a weighing operation of a package at said scale, said drive means including a driven shaft having cam means thereon for actuating a switch in said circuit at the end of said cycle to stop said drive means at the end of the cycle.

3. The weighing and labeling system of claim 1 wherein said scale platform comprises a plurality of spaced parallel ribs extending in the direction of movement of said conveyor, and wherein said plurality of conveying elements comprise endless travelling belts alternately disposed between said ribs.

4. The weighing and labeling system of claim 3 including means for automatically actuating said drive means to operate said endless belts in response to a completed weighing operation of a package at said scale.

5. The weighing and labeling system of claim 4 including means for automatically stopping said drive means to stop said traveling belts at the end of said cycle.

6. The package weighing and labeling system of claim 3 wherein said package stop means comprises a plurality of pins extending upwardly between said conveyor belts at said labeling position and vertically movable by said drive means into and out of the path of packages moving on said conveyor belts.

7. The package weighing and labeling system of claim 6 wherein said drive means includes a driven shaft having cam means thereon for engaging said package stop pins to move the pins into and out of the path of packages moving on said conveyor belts.

8. The package weighing and labeling system of claim 7 including means to automatically actuate said drive means in response to a completed weighing operation of a package at said scale and automatically stop said drive means at the end of said cycle.

9. A package weighing and labeling system comprising: a scale having a scale platform for weighing packages, said platform including a plurality of spaced parallel ribs; a labeling machine having a position for labeling packages; a power driven conveyor for moving a package from said scale platform to said labeling position, said conveyor including a plurality of endless belts alternately disposed between the ribs of the scale platform and extending to said labeling position, said conveyor being pivoted at one end for movement in a direction normal to the scale platform between a first position wherein the belts are below the scale platform to permit packages to be weighed on the platform and a second position wherein the belts protrude through the ribs of the scale platform forming a conveyor bed which moves a package from the scale platform after it has been weighed; movable package stop means for holding a weighed package at the labeling position for labeling; and drive means for pivoting the conveyor about said one end and moving said package stop means in timed relation through a cycle so as to move a weighed package from the scale platform to said labeling position and move the previously weighed and labeled package away from the labeling machine before said weighed package arrives at the labeling position.

10. The package weighing and labeling system of claim 9 wherein said drive means includes a driven shaft having cam means thereon for moving said conveyor about its pivoted end between said first and second positions.

11. The package weighing and labeling system of claim 10 wherein said package stop means comprises a plurality of pins extending upwardly between said conveyor belts at said labeling position and vertically movable by said drive means into and out of the path of packages moving on said conveyor belts.

12. The package weighing and labeling system of claim 11 wherein said drive means includes a common driven shaft having cam means thereon for pivoting said conveyor about said one end and moving said package stop pins in a timed relation through said cycle.

13. The package weighing and labeling system of claim 12 wherein said common driven shaft further includes cam means which operates an electrical switch at the end of said cycle to stop said drive means.

14. The package weighing and labeling system of claim 9 including means to hold said conveyor belts in said second position with the scale platform below the top surface of said conveyor belts so as not to disturb the scale platform when packages are placed on said belts above the scale platform thereby permitting repeat labeling of all packages with a weight preset on the scale, and means for selectively actuating said drive means for said cycle of operation.

15. The package weighing and labeling system of claim 14 wherein said holding means includes a plurality of support pins beneath said conveyor and normally in vertical alinement with a plurality of slots in said conveyor, said support pins being selectively movable horizontally out of alinement with said slots to abut against the underside of the conveyor to prevent the conveyor from moving from said second to said first positions.

16. A package handling mechanism for use in a package weighing and labeling system which includes a scale having a scale platform for weighing packages and a labeling machine having a position for labeling packages, said mechanism comprising a common power driven conveyor which spans both the scale and the labeling machine and is pivoted at one end for movement in a direction normal to the scale platform, said conveyor including a plurality of endless traveling belts which cooperate with a plurality of spaced parallel ribs on the scale platform so that pivoting movement of the conveyor about said one end moves the conveyor belts between a first position wherein the belts are below the top surface of the scale platform ribs to permit packages to be weighed on the scale platform and a second position wherein the belts protrude through the scale platform ribs forming a conveyor bed which picks up a package from the scale platform after it has been weighed and moves the package toward the labeling position, movable package stop means extend upwardly between the conveyor belts at the labeling position for holding a package at the labeling position, and a single common drive means for pivoting the conveyor about said one end and moving the package stop means in timed relation through a cycle so as to move a weighed package from the scale platform toward the labeling position and to move the previously weighed and labeled package from the labeling position before said weighed package arrives at the labeling position.